(12) United States Patent
Kim et al.

(10) Patent No.: US 8,509,168 B2
(45) Date of Patent: Aug. 13, 2013

(54) METHOD FOR TRANSMITTING CQI IN WIRELESS COMMUNICATION SYSTEM

(75) Inventors: Hak Seong Kim, Seoul (KR); Young Woo Yun, Seoul (KR); Dae Won Lee, Seoul (KR); Bong Hoe Kim, Seoul (KR); Ki Jun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 425 days.

(21) Appl. No.: 12/865,992

(22) PCT Filed: Feb. 2, 2009

(86) PCT No.: PCT/KR2009/000509
§ 371 (c)(1),
(2), (4) Date: Aug. 3, 2010

(87) PCT Pub. No.: WO2009/096757
PCT Pub. Date: Aug. 6, 2009

(65) Prior Publication Data
US 2011/0002290 A1 Jan. 6, 2011

Related U.S. Application Data

(60) Provisional application No. 61/025,808, filed on Feb. 3, 2008.

(51) Int. Cl.
*H04W 24/10* (2009.01)
*H04W 72/04* (2009.01)

(52) U.S. Cl.
USPC .......................................... 370/329

(58) Field of Classification Search
USPC ................. 370/252, 311, 329, 328, 431, 433, 370/437
See application file for complete search history.

(56) References Cited

U.S. PATENT DOCUMENTS

| | | | |
|---|---|---|---|
| 2009/0201825 A1* | 8/2009 | Shen et al. | 370/252 |
| 2011/0223924 A1* | 9/2011 | Lohr et al. | 455/450 |
| 2012/0177137 A1* | 7/2012 | Cheng et al. | 375/260 |

FOREIGN PATENT DOCUMENTS

| | | |
|---|---|---|
| KR | 10-2006-0019480 | 3/2006 |
| KR | 10-2006-0054652 | 5/2006 |
| KR | 10-2007-0080760 | 8/2007 |
| WO | 2007/015529 | 2/2007 |
| WO | 2007/023515 | 3/2007 |
| WO | 2007/136002 | 11/2007 |

OTHER PUBLICATIONS

Ericsson et al., "Way forward for CQI reporting," R1-073844, 3GPP TSG-RAN WG1 Meeting #50, Aug. 2007, XP-050107412.

(Continued)

*Primary Examiner* — Andrew Lai
*Assistant Examiner* — Zhiren Qin
(74) *Attorney, Agent, or Firm* — Lee, Hong, Degerman, Kang & Waimey

(57) ABSTRACT

A method of transmitting a channel quality indicator (CQI) in a wireless communication system is provided. The method includes receiving an uplink grant on a downlink channel, the uplink grant comprising a CQI report indicator, a transport format field and a resource assignment field, the CQI report indicator indicating whether a CQI is reported, the transport format filed indicating a transport format of the CQI, the resource assignment field indicating the number of resource blocks used for reporting the CQI and transmitting the CQI on an uplink channel by using the uplink grant.

11 Claims, 8 Drawing Sheets

(56) References Cited

OTHER PUBLICATIONS

Nokia et al., "Discussion of short format DL allocation within UL grant," R1-073650, 3GPP TSG-RAN WG1 Meeting #50, Aug. 2007, XP-050107246.

3rd Generation Partnership Project (3GPP), "Technical Specification Group Radio Access Network;Evolved Universal Terrestrial Radio Access (E-UTRA) and Evolved Universal Terrestrial Radio Access Network (E-UTRAN); Overall description; Stage 2 (Release 8)," 3GPP TS 36.300, V8.3.0, Dec. 2007, XP-050377578.

Huawei, "CQI and PMI resource management," R1-074233, TSG RAN WG1 meeting #50bis, Oct. 2007, XP-050107759.

\* cited by examiner

METHOD FOR TRANSMITTING CQI IN WIRELESS COMMUNICATION SYSTEM

CROSS-REFERENCE TO RELATED APPLICATIONS

This application is the National Stage filing under 35 U.S.C. §371 of International Application No. PCT/KR2009/000509, filed on Feb. 2, 2009, which claims the benefit of U.S. Provisional Application Ser. No. 61/025,808, filed on Feb. 3, 2008.

TECHNICAL FIELD

The present invention relates to wireless communications, and more particularly, to a method of transmitting a channel quality indicator (CQI) in a wireless communication system.

BACKGROUND ART

Wireless communication systems are widely spread all over the world to provide various types of communication services such as voice or data. In general, the wireless communication system is a multiple access system capable of supporting communication with multiple users by sharing available radio resources. Examples of the radio resource include a time, a frequency, a code, transmit power, etc. Examples of the multiple access system include a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system, etc. The radio resource is a time in the TDMA system, a code in the CDMA system, and a subcarrier and a time in the OFDM system.

The wireless communication system is designed for the purpose of providing reliable communication to a plurality of users irrespective of their locations and mobility. However, a wireless channel has an non-ideal characteristic such as a fading phenomenon caused by a path loss, noise, and multi-path, an inter-symbol interference (ISI), a Doppler effect caused by mobility of a user equipment, etc. Therefore, various techniques have been developed to overcome the non-ideal characteristic of the wireless channel and to increase reliability of wireless communication.

Adaptive modulation and coding (AMC) is a technique for increasing reliability of radio communication. The wireless communication system may use a channel quality indicator (CQI) to support the AMC. The CQI is information regarding a channel condition between a base station (BS) and a user equipment (UE). The BS determines a modulation and coding scheme (MCS) used in transmission by using the CQI received from the UE. If the channel condition is determined to be good by the use of the CQI, the BS may increase a data rate by increasing a modulation order or a coding rate. If the channel condition is determined to be poor by the use of the CQI, the BS may decrease the data rate by decreasing the modulation order or the coding rate. The decrease in the data rate may result in the decrease in a reception error rate.

The CQI may be periodically transmitted. The periodical transmission of the CQI implies that the CQI is transmitted without an additional request from the BS according to a period determined by the BS or according to a predetermined period. In case of the periodical transmission, a CQI information amount, a modulation scheme, a channel coding scheme, etc., may be predetermined. In this case, an overhead of signaling required for CQI transmission can be reduced.

Meanwhile, a CQI information amount to be transmitted may be greater than a predetermined CQI information amount. In addition, since the wireless communication system is a time variant system, the channel condition changes over time. If a CQI transmission period is significantly long, the BS cannot recognize the changed channel condition. In this case, the BS cannot determine an MCS suitable for the channel condition. This may result in deterioration of reliability of the wireless communication system, and deterioration of overall system performance.

Therefore, to increase flexibility of CQI transmission, the CQI needs to be transmitted not only periodically but also aperiodically. The aperiodic transmission of the CQI implies that the CQI is transmitted in response to a request from the BS. In this case, a detailed transmission method (i.e., a radio resource, a modulation scheme, etc.) for aperiodic CQI transmission is problematic. This is because, if the transmission method is predetermined as in the periodic CQI transmission, flexibility of communication is decreased, and a signaling overhead is increased when signaling is performed on the radio resource, the modulation scheme, etc., at every aperiodic CQI request. Accordingly, there is a need to provide a method of effectively transmitting the CQI.

DISCLOSURE

Technical Problem

The present invention provides a method of transmitting a channel quality indicator (CQI) in a wireless communication system.

Technical Solution

In one aspect, a method of transmitting a channel quality indicator (CQI) in a wireless communication system, carried in a user equipment, is provided. The method includes receiving an uplink grant on a downlink channel, the uplink grant comprising a CQI report indicator, a transport format field and a resource assignment field, the CQI report indicator indicating whether a CQI is reported, the transport format filed indicating a transport format of the CQI, the resource assignment field indicating the number of resource blocks used for reporting the CQI and transmitting the CQI on an uplink channel by using the uplink grant when the CQI report indicator indicates reporting the CQI and the transport format field indicates a specific modulation and coding scheme (MCS) index selected from a transport format table which is a set of MCS indexes used for a transport block for uplink shared channel (UL-SCH).

In another aspect, an apparatus for a wireless communication is provided. The apparatus includes a radio frequency (RF) unit for transmitting and receiving radio signals and a processor coupled with the RF unit and configured to receive an uplink grant, the uplink grant comprising a CQI report indicator, a transport format field and a resource assignment field, the CQI report indicator indicating whether a CQI is reported, the transport format filed indicating a transport format of the CQI, the resource assignment field indicating the number of resource blocks used for reporting the CQI and transmit the CQI by using the uplink grant when the CQI report indicator indicates reporting the CQI and the transport format field indicates a specific MCS index selected from a transport format table which is a set of MCS indexes used for a transport block for UL-SCH.

In still another aspect, a method of requesting an aperiodic CQI reporting in a wireless communication system, carried in a base station, is provided. The method includes generating an uplink grant comprising a CQI report indicator, a transport format field and a resource assignment field, the CQI report indicator indicating whether an aperiodic CQI is reported, the transport format filed indicating a transport format of the aperiodic CQI, the resource assignment field indicating the number of resource blocks used for reporting the aperiodic CQI and transmitting the uplink grant on a downlink channel to request the aperiodic CQI reporting, wherein the CQI report indicator indicates reporting the aperiodic CQI and the transport format field indicates a specific MCS index selected from a transport format table which is a set of MCS indexes used for a transport block for UL-SCH.

Advantageous Effects

A method of effectively transmitting a channel quality indicator (CQI) is provided. Therefore, overall system performance can be improved.

MODE FOR INVENTION

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). $3^{rd}$ generation partnership project (3GPP) long term evolution (LTE) is a part of an evolved UMTS (E-UMTS) using the E-UTRA. The 3GPP LTE employs the OFDMA in downlink and employs the SC-FDMA in uplink.

For clarity, the following description will focus on the 3GPP LTE. However, technical features of the present invention are not limited thereto.

Figure 1:
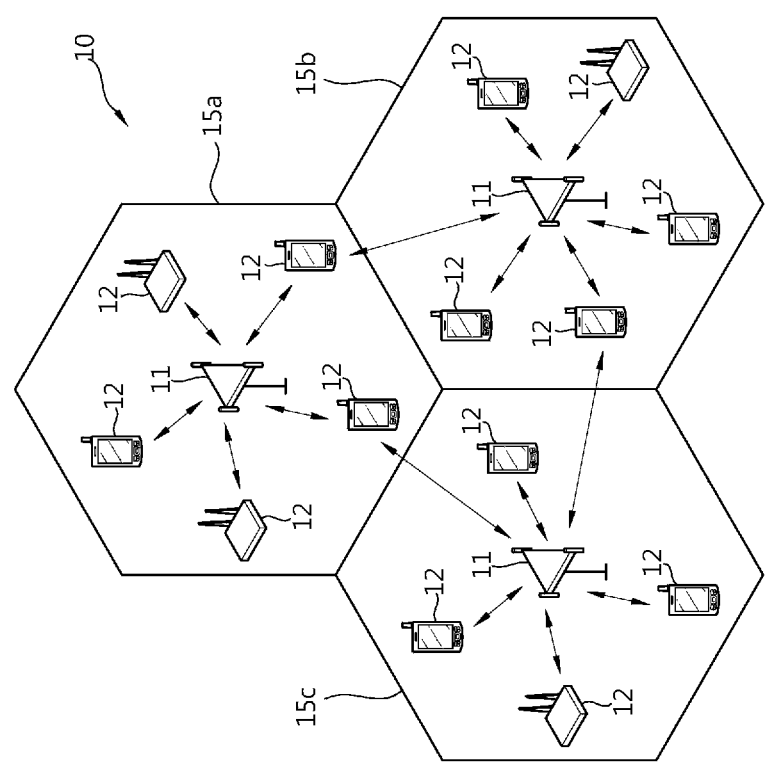
FIG. 1 shows a wireless communication system.

FIG. 1 shows a wireless communication system.

Referring to FIG. 1, a wireless communication system 10 includes at least one base station (BS) 11. The BSs 11 provide communication services to specific geographical regions (generally referred to as cells) 15a, 15b, and 15c. The cell can be divided into a plurality of regions (referred to as sectors). A user equipment (UE) 12 may be fixed or mobile, and may be referred to as another terminology, such as a mobile station (MS), a user terminal (UT), a subscriber station (SS), a wireless device, a personal digital assistant (PDA), a wireless modem, a handheld device, etc. The BS 11 is generally a fixed station that communicates with the UE 12 and may be referred to as another terminology, such as an evolved node-B (eNB), a base transceiver system (BTS), an access point, etc.

Hereinafter, a downlink (DL) denotes a communication link from the BS to the UE, and an uplink (UL) denotes a communication link from the UE to the BS. In the DL, a transmitter may be a part of the BS, and a receiver may be a part of the UE. In the UL, the transmitter may be a part of the UE, and the receiver may be a part of the BS.

Figure 2:
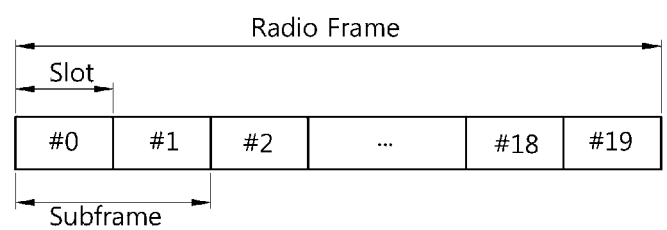
FIG. 2 shows an exemplary structure of a radio frame in a $3^{rd}$ generation partnership project (3GPP) long term evolution (LTE).

FIG. 2 shows an exemplary structure of a radio frame in the 3GPP LTE. The radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

One UL slot includes a plurality of SC-FDMA symbols (e.g., 7 SC-FDMA symbols) in a time domain, and includes a plurality of resource blocks in a frequency domain. The SC-FDMA symbol is for expressing one symbol period, and may be referred to as an OFDM symbol or a symbol duration according to a system. The resource block includes a plurality of subcarriers (e.g., 12 subcarriers) in a resource assignment unit in the frequency domain. The number $N^{UL}$ of resource blocks included in the UL slot depends on a UL transmission bandwidth determined in a cell.

One DL slot includes a plurality of OFDM symbols (e.g., 7 OFDM symbols) in the time domain, and includes a plurality of resource blocks in the frequency domain. The number $N^{DL}$ of resource blocks included in the DL slot depends on a DL transmission bandwidth determined in a cell.

The radio frame of FIG. 2 is shown for exemplary purposes only. Thus, the number of subframes included in the radio frame or the number of slots included in the subframe or the number of symbols included in the slot may change variously.

Figure 3:
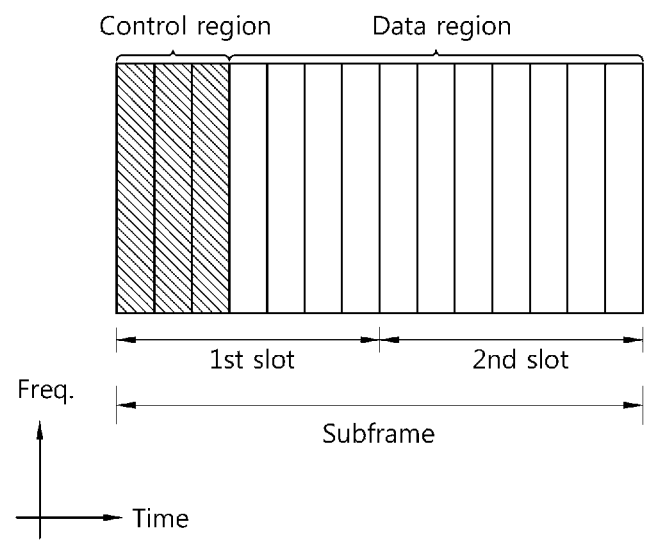
FIG. 3 shows an exemplary structure of a downlink subframe in a 3GPP LTE.

FIG. 3 shows an exemplary structure of a DL subframe in the 3GPP LTE. The subframe includes two consecutive slots. A maximum of three OFDM symbols located in a front portion of a $1^{st}$ slot within the DL subframe correspond to a control region to be assigned with a physical downlink control channel (PDCCH). The remaining OFDM symbols correspond to a data region to be assigned with a physical downlink shared channel (PDSCH). In addition to the PDCCH, control channels such as a physical control format indicator channel (PCFICH), a physical hybrid ARQ indicator channel (PHICH), etc., can be assigned to the control region. The UE can read data information transmitted through the PDSCH by decoding control information transmitted through the PDCCH. Although the control region includes three OFDM symbols herein, this is for exemplary purposes only. The number of OFDM symbols included in the control region of the subframe can be known by using the PCFICH. The PHICH is a response for UL transmission, and carries hybrid automatic repeat request (HARQ) acknowledgement (ACK)/ not-acknowledgement (NACK) signal.

The PDCCH carries a DL grant that reports resource assignment for DL transmission on the PDSCH. More specifically, the PDCCH can carry a transport format and resource assignment of a downlink shared channel (DL-SCH), paging information on a paging channel (PCH), system information on the DL-SCH, resource assignment of an upper-layer control message such as a random access response transmitted on the PDSCH, a transmit power control command, activation of a voice over IP (VoIP), etc. Further, the PDCCH carries a UL grant that reports resource assignment of UL transmission to the UE.

Figure 4:
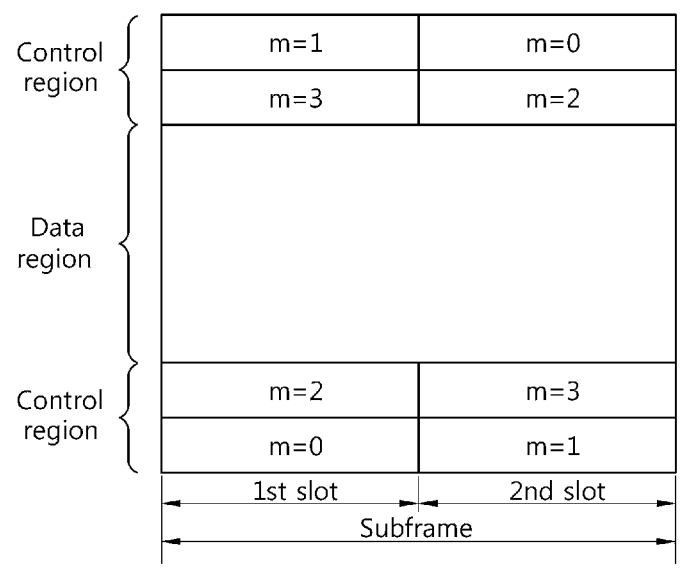
FIG. 4 shows an exemplary structure of an uplink subframe in a 3GPP LTE.

FIG. 4 shows an exemplary structure of a UL subframe in the 3GPP LTE.

Referring to FIG. 4, the UL subframe may be divided into a control region assigned to a physical uplink control channel (PUCCH) carrying UL control information and a data region assigned to a physical uplink shared channel (PUSCH) carrying user data. An intermediate part of the subframe is assigned to the PUSCH. Both end parts of the data region are assigned to the PUCCH. To maintain a single carrier feature in SC-FDMA, consecutive resource blocks in a frequency domain are assigned to a single UE. The single UE cannot simultaneously transmit the PUCCH and the PUSCH.

The PUSCH is mapped to an uplink shared channel (UL-SCH) that is a transport channel. Examples of UL control information transmitted on the PUCCH include an ACK/NACK signal used to perform HARQ, a channel quality indicator (CQI) indicating a DL channel condition, a scheduling request (SR) that is a UL radio resource assignment request, etc.

The PUCCH for the single UE is assigned to a resource block part in a subframe. Resource blocks belonging to the resource block pair occupy different subcarriers in each of the two slots. In this case, it is said that the resource block pair assigned to the PUCCH is frequency hopped in a slot boundary. Herein, a PUCCH (m=0), a PUCCH (m=1), a PUCCH (m=2), and a PUCCH (m=3) are assigned to the subframe, which is for exemplary purposes only.

The CQI is for expressing a DL channel condition. The CQI may include a CQI index and/or a precoding matrix index (PMI). The CQI index indicates each entity of a modulation and coding scheme (MCS) table including a plurality of entities consisting of combinations of coding rates and modulation schemes. The PMI is an index of a precoding matrix on a codebook. The CQI may indicate a channel condition on a full band and/or a channel condition on some bands included in the full band.

The UE can periodically transmit the CQI on the PUCCH. The UE performs channel coding on a CQI information bit to generate a coded CQI bit. In this case, the coded CQI bit has a fixed size. For example, if a block code (20, A) is used, the generated coded CQI bit always has a size of 20 bits irrespective of a size of the CQI information bit, where A is the size of the CQI information bit. The coded CQI bit is modulated according to a predetermined modulation scheme, and thus a modulated symbol is generated. In this case, the modulation scheme may be quadrature phase shift keying (QPSK). For example, the coded CQI bit having a size of 20 bits may be generated into 10 modulated symbols using QPSK. The modulated symbol is mapped to the PUCCH assigned to the UE. When a transport format of a periodic CQI is fixed, such as in a channel coding scheme, a modulation scheme, etc., it is referred to as a PUCCH-based transport format of the periodic CQI. The UE can also transmit a periodic CQI on the PUSCH by using the PUCCH-based transport format of the periodic CQI. As such, the periodic CQI uses the PUCCH-based transport format of the periodic CQI. Therefore, the periodic CQI has a fixed transport format and a limited transmissible CQI information amount.

To increase flexibility of CQI transmission, the CQI needs to be transmitted not only periodically but also aperiodically. For aperiodic CQI transmission, the BS has to instruct the UE to report the CQI, and also has to report a transport format such as a radio resource, a modulation scheme, a coding scheme, etc. However, as in the case of periodic CQI transmission, if the transport format is predetermined for an aperiodic CQI, the aperiodic CQI transmission results in deterioration of flexibility of wireless communication. In addition, if the BS reports the transport format for the CQI to the UE by using higher-layer signaling, the aperiodic CQI transmission is not appropriate when the transport format of the CQI is intended to be changed in a subframe unit. In addition, if a control information format for the aperiodic CQI transmission is newly defined, the addition of the new control information format results in increase of a system overhead, which is not effective. Therefore, aperiodic CQI reporting can be indicated using control information for UL data scheduling.

Figure 5:
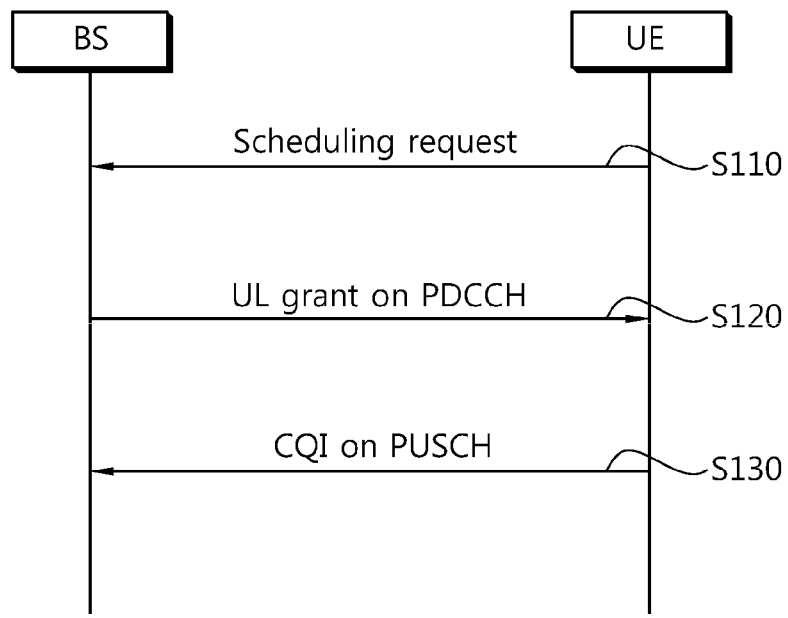
FIG. 5 is a flow diagram showing a channel quality indicator (CQI) transmission method according to an embodiment of the present invention.

FIG. 5 is a flow diagram showing a CQI transmission method according to an embodiment of the present invention.

Referring to FIG. 5, for UL transmission, a UE transmits a scheduling request (SR) to a BS on a PUCCH (step S110). The SR is used when the UE requests the BS to assign UL radio resources. The SR is a sort of preliminary information exchange for data exchange. In response to the SR, the BS transmits a UL grant to the UE on a DL channel (step S120). The DL channel may be a PDCCH. The UE transmits a CQI on a UL channel by using a UL grant (step S130). In this case, a transport block is not transmitted on the UL channel. The UL channel may be a PUSCH. A relationship between a subframe at which the PDCCH is transmitted and a subframe at which the PUSCH is transmitted may be predetermined between the BS and the UE. For example, if the PDCCH is transmitted through an $n^{th}$ subframe in a frequency division duplex (FDD) system, the PUSCH may be transmitted at an $(n+4)^{th}$ subframe.

The UL grant includes a CQI report indicator for indicating whether the CQI is reported, a resource assignment field for radio resource assignment, and a transport format field. In addition thereto, the UL grant may further include a flag field for distinguishing the UL grant from other control information, a hopping flag field for indicating whether frequency hopping is performed, a new data indicator (NDI) field for indicating whether UL data is newly transmitted or retransmitted, a transmit power control (TPC) command field for UL power control, a cyclic shift field for indicating cyclic shift of a reference signal for demodulation.

The UL grant is control information for UL data scheduling. In general, the UE transmits UL data on the PUSCH by using the UL grant. The UL data may be a transport block that is a data block for the UL-SCH and that is transmitted during a TTI. If the UL grant satisfies a specific condition, the UE transmits not the UL data but the CQI through the PUSCH. Hereinafter, the specific condition at which the CQI is transmitted on the PUSCH is described.

The CQI report indicator indicates whether the CQI is reported. For example, if the CQI report indicator is '1', it implies that the BS instructs the UE to report the CQI, and if the CQI report indicator is '0', it implies that the BS does not instruct the UE to report the CQI. As such, 1 bit is sufficient for the CQI report indicator. Therefore, even if the UL grant includes the CQI report indicator, an overhead of the UL grant is little increased.

The resource assignment field assigns a radio resource for CQI transmission. The radio resource assigned by the resource assignment field may be a resource block. The UE can know a position of the resource block assigned for CQI transmission, the number of resource blocks used for CQI reporting, etc., by using the resource assignment field. If the resource assignment field assigns a radio resource for UL data transmission, the number of resource blocks can be up to $N^{UL}$. In comparison thereto, a size of the radio resource assigned for CQI transmission may be limited to be lower than or equal to a threshold. If multiple input multiple output (MIMO) is considered, approximate four resource blocks are required for CQI transmission. Therefore, the threshold may be four.

The transport format field indicates a transport format for the CQI. The transport format may be a modulation scheme, a channel coding scheme, etc. A value of the transport format field is one specific MCS index selected from a transport format table. The transport format table is a set of MCS indices used for UL data. The modulation scheme for the CQI may be QPSK. The BS and the UE use a pre-agreed transport format table. Each of the MCS indices of the transport format table may correspond to a modulation scheme for UL data, a transport block size (TBS) index used to determine a size of the UL data, and a redundancy version used for channel coding on the UL data. The redundancy version indicates a start point of a mother code when a rate-matched bit is generated by performing rate matching from the mother code. The mother code is a bit generated by performing channel coding on an information bit. A specific value of the transport format field for CQI transmission may be a reserved MCS index of which a modulation scheme and a TBS index are not designated.

Table 1 shows an example of the transport format table.

TABLE 1

| MCS Index | Modulation Order | TBS Index | Redundancy Version |
|---|---|---|---|
| 0 | 2 | 0 | 0 |
| 1 | 2 | 1 | 0 |
| 2 | 2 | 2 | 0 |
| 3 | 2 | 3 | 0 |
| 4 | 2 | 4 | 0 |
| 5 | 2 | 5 | 0 |
| 6 | 2 | 6 | 0 |
| 7 | 2 | 7 | 0 |
| 8 | 2 | 8 | 0 |
| 9 | 2 | 9 | 0 |
| 10 | 2 | 10 | 0 |
| 11 | 4 | 10 | 0 |
| 12 | 4 | 11 | 0 |
| 13 | 4 | 12 | 0 |
| 14 | 4 | 13 | 0 |
| 15 | 4 | 14 | 0 |
| 16 | 4 | 15 | 0 |
| 17 | 4 | 16 | 0 |
| 18 | 4 | 17 | 0 |
| 19 | 4 | 18 | 0 |
| 20 | 4 | 19 | 0 |
| 21 | 6 | 19 | 0 |
| 22 | 6 | 20 | 0 |
| 23 | 6 | 21 | 0 |
| 24 | 6 | 22 | 0 |
| 25 | 6 | 23 | 0 |
| 26 | 6 | 24 | 0 |
| 27 | 6 | 25 | 0 |
| 28 | 6 | 26 | 0 |

TABLE 1-continued

| MCS Index | Modulation Order | TBS Index | Redundancy Version |
|---|---|---|---|
| 29 | reserved | | 1 |
| 30 | | | 2 |
| 31 | | | 3 |

The transport format table specifies a modulation order for indicating a modulation scheme, a TBS index, and a redundancy version according to an MCS index. A modulation order of 2 denotes QPSK. A modulation order of 4 denotes 16-quadrature amplitude modulation (QAM). A modulation order of 6 denotes 64-QAM. If MCS indices are integers in the range of 0 to 31 as shown in Table 1, the transport format field may have a size of 5 bits. In Table 1, a specific MCS index of the transport format field for CQI transmission may be 29. If the MCS index is 29, the modulation scheme and the TBS index are not specified, and the redundancy version is 1.

As such, if the CQI report indicator of the UL grant indicates CQI reporting and if the transport format field indicates one specific MCS index selected from the transport format table which is a set of MCS indices used for a transport block for the UL-SCH, the UE transmits the CQI to the BS by using the UL grant. By using the UL grant for UL data scheduling to indicate an aperiodic CQI, there is no need to newly add a control information format for the aperiodic CQI. Since it is sufficient to add only the CQI report indicator to the UL grant, there is an advantage in that a system overhead is not increased.

Figure 6:
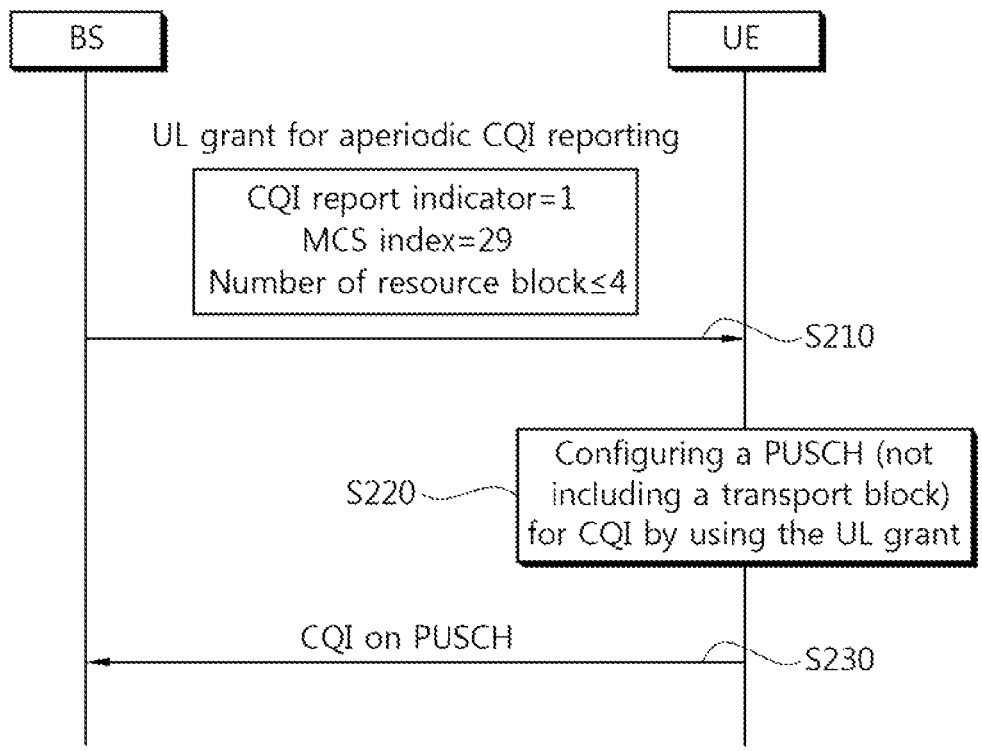
FIG. 6 is a flow diagram showing a CQI transmission method according to another embodiment of the present invention.

FIG. 6 is a flow diagram showing a CQI transmission method according to another embodiment of the present invention.

Referring to FIG. 6, a BS transmits a UL grant for aperiodic CQI reporting to a UE on a PDCCH (step S210). In the UL grant for aperiodic CQI reporting, a CQI report indicator is '1', an MCS index of a transport format field is '29', and the number of resource blocks used for CQI reporting indicated by a resource assignment field is lower than or equal to four. The UE configures a PUSCH for a CQI by using the UL grant (step S220). In this case, a transport block is not included in the PUSCH. The UE transmits the CQI to the BS on the PUSCH (step S230).

As described above, the CQI report indicator of the UL grant indicates CQI reporting, the transport format field indicates one specific MCS index selected from a transport format table which is a set of MCS indices used for a transport block for a UL-SCH, and the resource assignment field indicating the number of resource blocks used for CQI reporting has a value less than or equal to a threshold. In this case, the UE can transmit the CQI to the BS by using the UL grant. The UE may be allowed to transmit the CQI instead of transmitting a transport block only when each of a plurality of information fields included in the UL grant satisfies a specific condition. Thus, reliability of aperiodic CQI transmission can be increased. Accordingly, reliability of wireless communication can be increased, and overall system performance can be improved.

Figure 7:
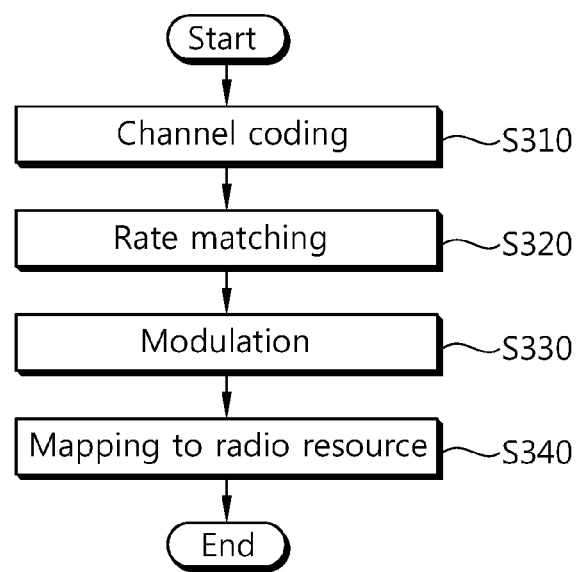
FIG. 7 is a flowchart showing an example of an aperiodic CQI generation method.

FIG. 7 is a flowchart showing an example of an aperiodic CQI generation method.

Referring to FIG. 7, in step S310, a UE performs channel coding on a CQI information bit to generate a coded bit. For example, a channel coding scheme may be tail biting convolution coding (TBCC) having a coding rate of ⅓. In step S320, the UE generates a rate-matched bit by performing rate matching on a coded bit in accordance with a size of a radio resource assigned using the UL grant. In step S330, the UE generates a modulated symbol by modulating the rate-matched bit. For example, QPSK may be used as a modulation scheme. In step S340, the UE maps the modulated symbol to the radio resource assigned using the UL grant.

Figure 8:
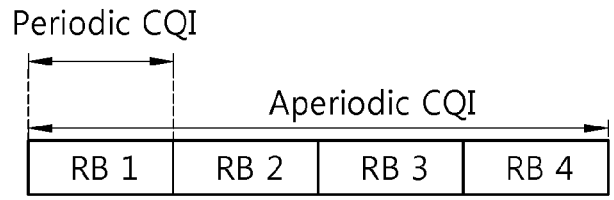
FIG. 8 shows a difference between a transport format of a periodic CQI and a transport format of an aperiodic CQI.

FIG. 8 shows a difference between a transport format of a periodic CQI and a transport format of an aperiodic CQI. It is assumed that a UE is assigned with four resource blocks RB 1, ..., RB 4. In case of the transport format of the periodic CQI, a CQI information bit is subjected to channel coding by using a block code (20, A), and is modulated by using QPSK. Thus, a coded CQI bit having a size of 20 bits is generated, and 10 modulated symbols are generated. The 10 modulated symbols are mapped only to one resource block. In this case, three resource blocks are unused, resulting in ineffective use of limited radio resources. In case of the transport format of the aperiodic CQI, channel coding is performed in accordance with four resource blocks. Accordingly, the CQI can be transmitted by effectively using the assigned radio resource.

Figure 9:
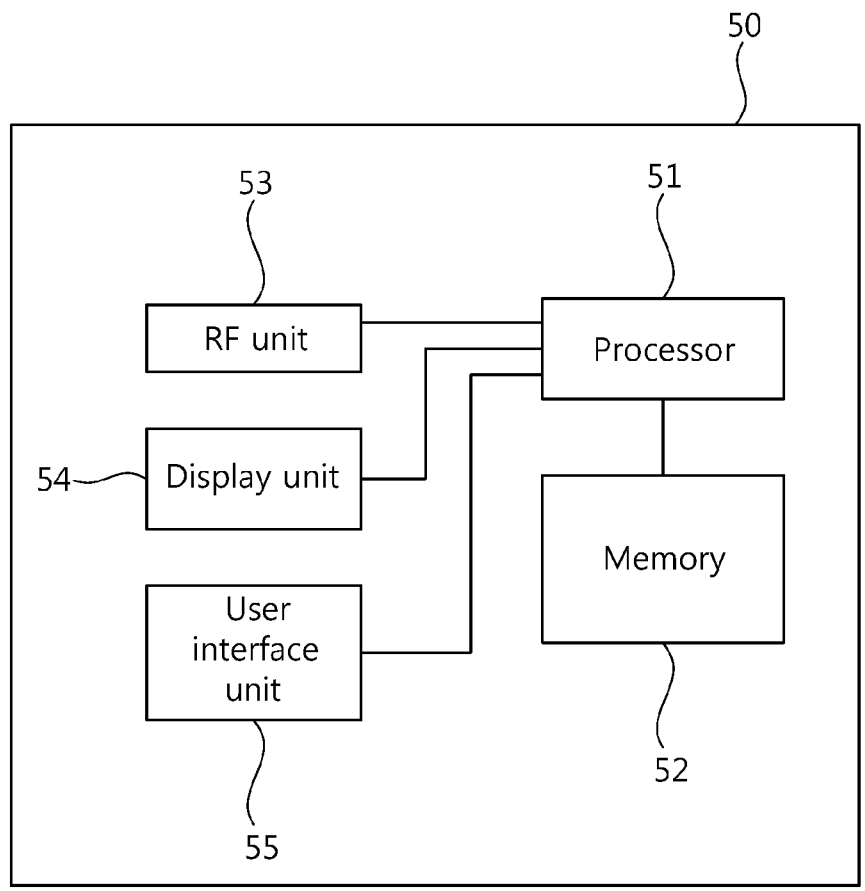
FIG. 9 is a block diagram showing an apparatus for wireless communication.

FIG. 9 is a block diagram showing an apparatus for wireless communication. An apparatus 50 for wireless communication may be a part of a UE. The apparatus 50 for wireless communication includes a processor 51, a memory 52, a radio frequency (RF) unit 53, a display unit 54, and a user interface unit 55. The RF unit 53 is coupled to the processor 51 and transmits and/or receives radio signals. The memory 52 is coupled to the processor 51 and stores an operating system, applications, and general files. The display unit 54 displays a variety of information of the UE and may use a well-known element such as a liquid crystal display (LCD), an organic light emitting diode (OLED), etc. The user interface unit 55 can be configured with a combination of well-known user interfaces such as a keypad, a touch screen, etc. The processor 51 supports adaptive modulation and coding (AMC). The processor can configure a PUCCH or a PUSCH, and can generate a CQI. The aforementioned embodiments for the CQI transmission method can be implemented by the processor 51.

The present invention can be implemented with hardware, software, or combination thereof. In hardware implementation, the present invention can be implemented with one of an application specific integrated circuit (ASIC), a digital signal processor (DSP), a programmable logic device (PLD), a field programmable gate array (FPGA), a processor, a controller, a microprocessor, other electronic units, and combination thereof, which are designed to perform the aforementioned functions. In software implementation, the present invention can be implemented with a module for performing the aforementioned functions. Software is storable in a memory unit and executed by the processor. Various means widely known to those skilled in the art can be used as the memory unit or the processor.

While the present invention has been particularly shown and described with reference to exemplary embodiments thereof, it will be understood by those skilled in the art that various changes in form and details may be made therein without departing from the spirit and scope of the invention as defined by the appended claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:

1. A method of transmitting a channel quality indicator (CQI) in a wireless communication system, carried in user equipment, the method comprising:

receiving an uplink grant on a downlink channel, the uplink grant comprising a CQI report indicator, a transport format field and a resource assignment field, the CQI report indicator indicating whether a CQI is to be reported, the transport format field indicating a transport format of the CQI, the resource assignment field indicating a number of resource blocks to be used for reporting the CQI; and transmitting the CQI on an uplink channel by using the uplink grant when the received CQI report indicator indicates reporting the CQI, the received transport format field indicates a specific modulation and coding scheme (MCS) index selected from a transport format table and a number of computed resource blocks based on the resource assignment field has a value lower than or equal to a threshold, wherein the transport format table is a set of MCS indexes used for a transport block for an uplink shared channel (UL-SCH) and the specific MCS index is a reserved MCS index in which a modulation order for uplink (UL) data and a transport block size (TBS) index used to determine a size of the UL data are not designated.

2. The method of claim 1, wherein the threshold is four so that the number of computed resource blocks used for reporting the CQI is lower than or equal to four.

3. The method of claim 1, wherein a size of the CQI report indicator is 1 bit.

4. The method of claim 3, wherein the CQI report indicator is set to 1 when the CQI report indicator indicates reporting the CQI.

5. The method of claim 1, wherein the transport format of the CQI uses quadrature phase shift keying (QPSK) when the transport format field indicates the specific MCS index.

6. The method of claim 1, wherein the transport format table is a set of 32 MCS indexes.

7. The method of claim 6, wherein the specific MCS index is 29.

8. The method of claim 1, wherein no transport block is transmitted on the uplink channel.

9. The method of claim 1, wherein the downlink channel is a physical downlink control channel (PDCCH) and the uplink channel is a physical uplink shared channel (PUSCH).

10. An apparatus for a wireless communication, the apparatus comprising:

a radio frequency (RF) unit for transmitting and receiving radio signals; and a processor coupled with the RF unit and configured to:

receive an uplink grant, the uplink grant comprising a channel quality indicator (CQI) report indicator, a transport format field and a resource assignment field, the CQI report indicator indicating whether a CQI is to be reported, the transport format field indicating a transport format of the CQI, the resource assignment field indicating a number of resource blocks to be used for reporting the CQI; and transmit the CQI by using the uplink grant when the received CQI report indicator indicates reporting the CQI, the received transport format field indicates a specific modulation and coding scheme (MCS) index selected from a transport format table and a number of computed resource blocks based on the resource assignment field has a value lower than or equal to a threshold, wherein the transport format table is a set of MCS indexes used for a transport block for an uplink shared channel (UL-SCH) and the specific MCS index is a reserved MCS index in which a modulation order for uplink (UL) data and a transport block size (TBS) index used to determine a size of the UL data are not designated.

11. A method of requesting an aperiodic channel quality indicator (CQI) reporting in a wireless communication system, carried in a base station, the method comprising:

generating an uplink grant comprising a CQI report indicator, a transport format field and a resource assignment field, the CQI report indicator indicating whether an aperiodic CQI is to be reported, the transport format field indicating a transport format of the aperiodic CQI, the resource assignment field indicating a number of resource blocks to be used for reporting the aperiodic CQI; and transmitting the uplink grant on a downlink channel to request the aperiodic CQI reporting, wherein the CQI report indicator indicates reporting the aperiodic CQI and the transport format field indicates a specific modulation and coding scheme (MCS) index selected from a transport format table which is a set of MCS indexes used for a transport block for an uplink shared channel (UL-SCH) and a number of computed resource blocks based on the resource assignment field has a value lower than or equal to a threshold, and wherein the specific MCS index is a reserved MCS index in which a modulation order for uplink (UL) data and a transport block size (TBS) index used to determine a size of the UL data are not designated.

* * * * *